(12) United States Patent
Wilde et al.

(10) Patent No.: US 11,131,406 B2
(45) Date of Patent: Sep. 28, 2021

(54) SEAL FOR ENGINE FIREWALL

(71) Applicant: ROLLS-ROYCE DEUTSCHLAND LTD & CO KG, Blankenfelde-Mahlow (DE)

(72) Inventors: Raife Wilde, Berlin (DE); Paul Vincent, Mittenwalde-Motzen (DE); Gavin Marshall, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 177 days.

(21) Appl. No.: 16/450,547

(22) Filed: Jun. 24, 2019

(65) Prior Publication Data
US 2020/0400250 A1 Dec. 24, 2020

(51) Int. Cl.
F16J 15/02 (2006.01)
F16L 5/04 (2006.01)
F16L 5/10 (2006.01)

(52) U.S. Cl.
CPC ............. F16L 5/04 (2013.01); F16J 15/021 (2013.01); F16L 5/10 (2013.01)

(58) Field of Classification Search
CPC .. F16J 15/00; F16J 15/021; F16J 15/02; F16J 15/022; F16J 15/025; F16J 15/027; F16J 15/46; F16J 15/48; F16L 5/04; F16L 5/00; F16L 5/10

USPC ........................................................ 277/606
See application file for complete search history.

(56) References Cited

U.S. PATENT DOCUMENTS

| | | | | |
|---|---|---|---|---|
| 7,828,298 | B2* | 11/2010 | Cummings | A62C 2/06 |
| | | | | 277/502 |
| 9,541,197 | B2* | 1/2017 | Contreras | B29C 43/203 |
| 2008/0265526 | A1* | 10/2008 | Cummings | F16L 5/025 |
| | | | | 277/606 |
| 2012/0306164 | A1* | 12/2012 | Contreras | F16J 3/041 |
| | | | | 277/634 |
| 2012/0312602 | A1 | 12/2012 | Zhang et al. | |
| 2016/0215917 | A1* | 7/2016 | Army, Jr. | F16L 57/02 |
| 2018/0266263 | A1* | 9/2018 | Jacon | F01D 21/14 |
| 2018/0291841 | A1* | 10/2018 | Lacroix | F02K 3/075 |

FOREIGN PATENT DOCUMENTS

FR 3036136 A1 11/2016

* cited by examiner

*Primary Examiner* — Nathan Cumar
(74) *Attorney, Agent, or Firm* — Shuttleworth & Ingersoll PLC; Timothy Klima

(57) ABSTRACT

Disclosed is a seal for an engine firewall. The seal including a proximal part having a recess; a distal part having a notch; and a flexible intermediate part integrally extending between the proximal part and the distal part.

8 Claims, 3 Drawing Sheets

SEAL FOR ENGINE FIREWALL

TECHNICAL FIELD

The present disclosure relates generally to a sealing arrangement, and more specifically, to a seal for an engine firewall.

BACKGROUND

Conventionally, engines (such as aircraft engines and automobile engines) are designed with high temperature zones (such as combustion chambers) and low temperature zones (such as fuel containers, compartments, and the like). Typically, engines have firewalls that separate the high temperature zones from low temperature zones. During operation of the engines, the firewall serves to reduce heat exchange between such zones. However, an exemplary engine firewall, such as a service tray, includes openings or apertures that allow functional pass-through elements, such as ducting, piping and/or cables, to extend therethrough. For example, in an aircraft engine, the service tray may support the pass-through elements, such as, high pressure bleed lines, electrical cables and so forth. Further, such pass-through elements are arranged on the service tray with the help of aperture sealing assemblies to avoid any gap between such pass-through elements and the service tray. This is to avoid any possibility of fuel, oil, fume leakage between the high and low temperature zones.

Typically, the aperture sealing assemblies for the service tray includes multiple parts, which seal any gap between such pass-through elements and the service tray. An exemplary aperture sealing assembly may include an intermediate housing arranged on the service tray, a first seat member coaxially coupled to the intermediate housing and a second seat member arranged on the first seat member. However, a non-integral coupling between various parts (i.e. the intermediate housing, and the first and second seats) of the aperture sealing assemblies and the service tray gives rise to a possibility of fuel, oil or fume leakage between the high and low temperature zones. For example, a non-integral coupling between the first seat member and the intermediate housing may cause such leakage. Therefore, in light of the foregoing discussion, there exists a need to overcome the aforementioned drawbacks associated sealing of the firewalls.

SUMMARY

The present disclosure seeks to provide a seal for an engine firewall. The present disclosure seeks to provide a solution to the existing problem of leakage in the engine firewall leading to cross-contamination across zones separated by such engine firewall. An aim of the present disclosure is to provide a solution that overcomes at least partially the problems encountered in prior art, and provides enhanced sealing property for aperture sealing assemblies of the firewalls.

Embodiments of the present disclosure provide a seal for an engine firewall, the seal comprising:
  a proximal part having a recess;
  a distal part having a notch; and
  a flexible intermediate part integrally extending between the proximal part and the distal part.

Embodiments of the present disclosure substantially eliminate or at least partially address the aforementioned problems in the prior art, and provides a strong, flexible and fire-resistant and/or fire-proof sealant to isolate different zones separated by the engine firewall.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
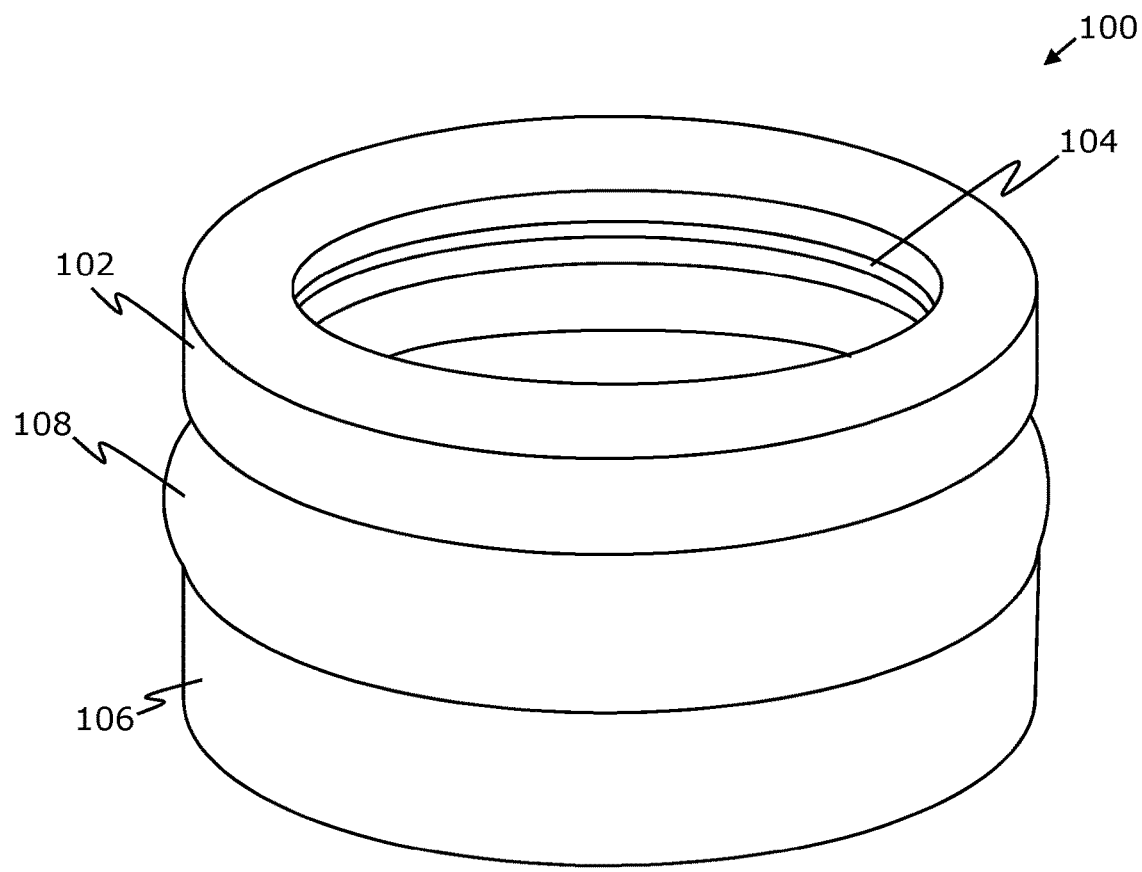
FIG. 1 is a perspective view of a seal, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Embodiments of the present disclosure provide a seal for an engine firewall, the seal comprising:
  a proximal part having a recess;
  a distal part having a notch; and
  a flexible intermediate part integrally extending between the proximal part and the distal part.

Embodiments of the present disclosure provides a seal for an engine firewall. The seal is used in conjunction with an aperture sealing assembly of the engine firewall. The seal enables avoidance of leakages through the aperture sealing assembly and prevents cross-contamination of fluids between high and low temperature zones of the engine. Also, the seal is flexible and therefore provides a flexible support to withstand thermal expansions and compressions of the aperture sealing assembly, when subjected to substantial temperate and pressure differences.

Throughout the present disclosure, the term "engine firewall" refers to a sheet or a cover that acts as a partition between different zones (such as high and low temperature zones) of an engine. The engine fire wall may be embodied as a physical fire-proof barrier. In an example, the firewalls are employed to isolate two functionally separate zones such as combustion zones and compartments, for mitigating exchange of heat therebetween. It will be appreciated that the engine firewall may be constituted by different parts or components based on the presence of the high and low temperature zones. Further, the engine firewall may be a separate component of the engine or built as an integrated part of the engine. An exemplary engine firewall may include a service tray, associated with a service fairing.

According to an embodiment, the engine firewalls are provided with holes or apertures that allow functional pass-through elements (services), such as ducting, piping and/or cables, to extend therethrough for communicating fluid, fuels, electricity and the like. For example, the pipes may be used for carrying or transferring a fluid from one zone to another, or allowing cables to pass therethrough.

The present disclosure relates to a seal for the engine firewall, such as a service tray. The term "seal" refers to a sealant used to avoid any leakages due to non-integral coupling of an aperture sealing assembly. Specifically, the seals are provided in conjunction with the connectors, couplings, linkages being arranged on the engine firewalls. Furthermore, the seals are capable of restricting the flow of heat and pressure through the gaps between passages (such as holes and apertures), to block leakages therefrom. In an example, the seal may be made of a self-extinguishing type material for example silicon rubber which can withstand temperatures up to 300 degree Celsius. Further, the seal may include elastic properties such that the seal can easily accommodate relative movements when the services passing through are subjected to thermal compression and/or expansion. In an example, the seal may have shape such as a spherical frustum, cylindrical, hemispherical, and the like. In an embodiment, the seal may be designed or configured to resemble a shape of a tulip flower.

According to an embodiment of the present disclosure, the seal is operable or designed to be used in conjunction with an aperture sealing assembly, typically arranged on an engine firewall, such as the service tray. It will be appreciated that the aperture sealing assembly may include multiple parts or segments, such as an intermediate housing configured to be arranged on the engine firewall, a first seat member configured to be coaxially coupled to the intermediate housing and a second seat member designed to be arranged on the first seat member. The term "aperture sealing assembly" used herein refers to an arrangement of the connectors, such as housing, seats and the like, arranged on the apertures or holes of the engine firewall. For example, the aperture sealing assembly may enable pipes to be arranged on the fire wall or allows the cables to pass therethrough. For example, ends of a pipe may be coupled to ends of the aperture sealing assembly. Accordingly, a section of the pipe, associated with a first zone (a high temperature zone) of the engine, lies on one side of the engine firewall, and another section of the pipe associated with a second zone (a low temperature zone) of the engine, lies on another side of the engine firewall. For example, a pipe connected from a fuel container (positioned in the low temperature zone) opens to combustion chamber (i.e. the high temperature zone) by passing through the engine firewall.

In an embodiment, the aperture sealing assembly is employed with the seal of the present disclosure to avoid any leakage that may occur through the gaps, which may be present in the engine firewall due to non-integral coupling of the aperture sealing assembly with the engine firewall. As mentioned herein above, the aperture sealing assembly has the intermediate housing arranged on the engine firewall to provide a rigid support to the entire assembly. The term "intermediate housing" used herein, refers to a casing or a cylindrical shell accommodated inside the apertures of the engine firewall, arranged to provide a protective layer and rigidity to the aperture sealing assembly. The function of the intermediate housing is to primarily seal the connection of the aperture sealing assembly with the engine firewall. In an embodiment, the intermediate housing may be a hollow cylindrical structure with a centrally and inwardly extending lip with a hole therein. Further, the intermediate housing may be made of a material, such as variant of corrosion resistant steel (CRES), alloy, metal or any combination thereof. Furthermore, the intermediate housing may be coupled to the engine firewall using nuts, bolts, screws, welding, and the like.

Optionally, the first seat member may be a hollow cylindrical structure surrounded by the intermediate housing. In an instance, the first seat member includes a disc (extending radially) having a recess to accommodate a thickness of the lip that extends centrally and inwardly from the intermediate housing. Accordingly, the intermediate housing is coaxially coupled to the first seat member to provide sealing to the aperture sealing assembly. Furthermore, a second seat member is arranged on the first seat member to act as a connection between the first seat member and an end of a pipe. Optionally, the shape of the first and second seat members may be similar to each other. Additionally, the circumferential size of the two members may be uniform. Optionally, the shape and size of the first and second seat members may be different from each other. Optionally, the first and second seat members are made up of fire resistant and/or fire-proof, non-corrosive material, and the like. For example, the material may include corrosion resistant steel (CRES), metals, metal alloys and the like.

The seal comprises a proximal part having a recess. The term "proximal part" used herein, refers to a section of the seal, that in operation, encloses the second seat member. Specifically, the recess in the proximal part, is configured to receive a seat disc extending radially from the second seat member for securing the proximal part with the second seat member. The term "seat disc" refers to a plate or a lip integral to the second seat member, which in operation supports the proximal part upon being received by the recess. It will be appreciated that the second seat member includes the seat disc, which is accommodated by the recess of the proximal part, to provide a sealing thereto. Additionally, arrangement of the proximal part on the second seat member provides a rigid support to the seal and the aperture sealing assembly. In an example, the proximal part includes a uniform thickness throughout. For example, the uniform thickness of the proximal part may be a small number of millimetres (mm), such as 2 to 5 mm.

The seal further comprises a distal part having a notch. The term "distal part" used herein, refers to a section of the seal, that in operation, is configured to receive a periphery of the intermediate housing to allow the distal part to rest on the periphery. The term "periphery" refers to a wide opening or a boundary of the intermediate housing covering the first seat member. Furthermore, the notch accommodates the periphery of the intermediate housing in a manner such that the distal part holds and rests on the intermediate housing.

Optionally, the distal part is composed of a flexible material such as silicon rubber, therefore easily accommodating thermal compression and expansion forces. The notch present on the distal part helps the seal to stay locked in a static state. The distal part includes a uniform thickness throughout, similar to the proximal part. For example, the uniform thickness of the distal part may be a small number of millimetres (mm), such as 2 to 5 mm.

Optionally, the distal part comprises orthogonal tabs forming the notch to receive the periphery. The term "orthogonal tabs" used herein refers to a pair of tabs perpendicular to each other and defining an L cavity, which forms the notch to receive the periphery of the intermediate housing. In another example, the orthogonal tabs may be inclined to each other at an angle and still forming the notch to receive the periphery.

The seal comprises a flexible intermediate part integrally extending between the proximal part and the distal part. The term "flexible intermediate part" refers to a section of the seal, that in operation, provides a flexible support to the proximal part and the distal part. Furthermore, the flexible intermediate part acts as a flexible outer shell of the seal. Moreover, the flexible intermediate part includes a length relatively greater than lengths of the proximal part and the distal part. In an example, the intermediate part is a hollow tubular structure with outwardly bulging (or curved) wall.

The flexible intermediate part is composed of flexible/elastic material for example, silicon rubber, ethylene propylene diene (EPDM), nitrile rubber (NBR) and the like. Due to flexibility, the flexible intermediate part accommodates a major part of fluctuations and forces, such as thermal expansions and thermal compressions, of the aperture sealing assembly. Specifically, the curved (outwardly bulging) wall of the flexible intermediate part contracts and releases to accommodate the aforementioned thermal compressions and thermal expansions, respectively.

It will be appreciated that when in operation (or use) the seal is mounted on the aperture sealing assembly, the seal enables avoidance of a possible leakage that may occur due to non-integral coupling between the intermediate housing and the first seat member. Specifically, the use of the seal enables avoidance of possible leakage due to the non-integral coupling of the disc (of the first seat member) and the lip (of the intermediate housing).

Optionally, the flexible intermediate part comprises a centrally located fabric-reinforced layer. The term "fabric-reinforced layer" relates to thin flat sheets having thickness in micrometres, provided therein to support the flexible intermediate part, in withstanding high and repeated thermal forces (thermal compressions and expansions). In an example, the flexible intermediate part may comprise multiple layers of fabric-reinforced layers. Notably, the fabric reinforced layer may include materials of glass fibre, carbon fibre, aramid fibres and the like. The fabric reinforced layer provides added protection to the seal thus protecting it from distortion or coming out due to sudden substantial forces, and still maintaining sealing attribute of the aperture sealing assembly.

Optionally, the seal further comprises a flame-resistant layer arranged on an outer surface thereof. Specifically, the flame-resistant layer is coated over an entire outer surface of the seal to protect the seal from fire. The flame-resistant layer provides improved temperature tolerance to the seal thus withstanding high temperatures. In an example, the flame-resistant layer is made of Nomex, PYROMEX, Kevlar, and the like.

DETAILED DESCRIPTION OF THE DRAWINGS

Referring to FIG. 1, illustrated is a perspective view of a seal 100, in accordance with an embodiment of the present disclosure. The seal 100 includes a proximal part 102 having a recess 104, a distal part 106 having a notch (202, shown in FIG. 2) and a flexible intermediate part 108 integrally extending between the proximal part 102 and the distal part 106.

Figure 2:
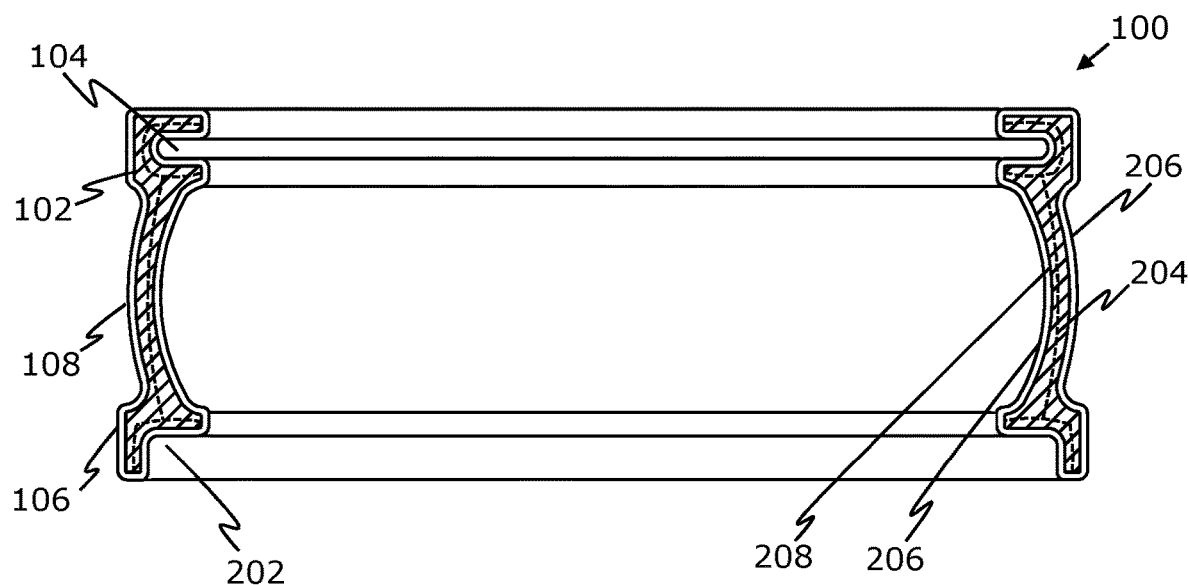
FIG. 2 is a cross-sectional view of the seal of FIG. 1, in accordance with an embodiment of the present disclosure.

Referring to FIG. 2, illustrated is a cross-sectional view of the seal 100 of FIG. 1, in accordance with an embodiment of the present disclosure. As shown, the seal 100 includes the proximal part 102 having the recess 104, the distal part 106 having a notch 202 and the flexible intermediate part 108. Furthermore, the flexible intermediate part 108 further includes a centrally located fabric-reinforced layer 204. Additionally, the seal 100 further includes a flame-resistant layer 206 disposed on an outer surface 208.

Figure 3:
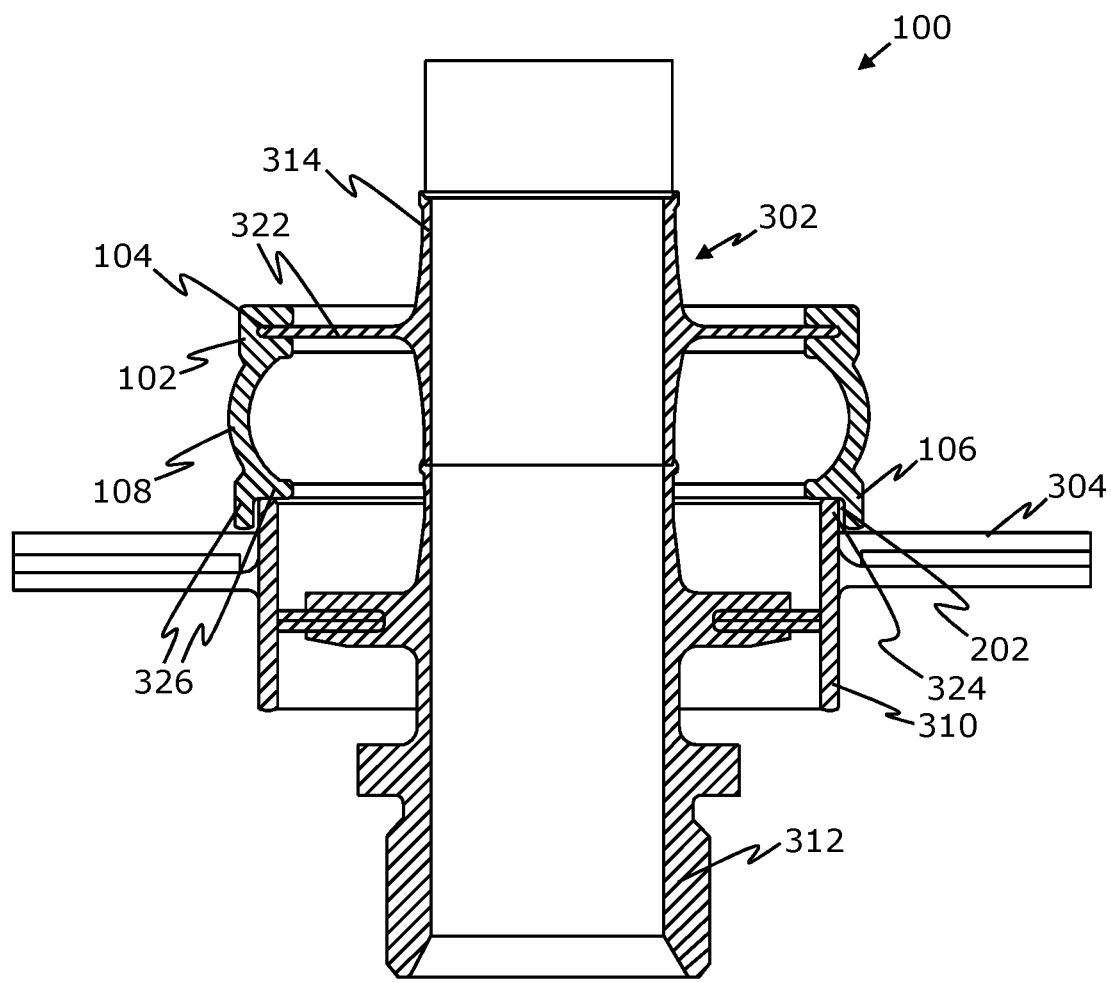
FIG. 3 is a cross-sectional view of seal of FIG. 1 mounted on an aperture sealing assembly arranged on an engine firewall, in accordance with an embodiment of the present disclosure.

Referring to FIG. 3, illustrated is a schematic illustration of a seal 100 of FIG. 1 mounted on an aperture sealing assembly 302 arranged on an engine firewall 304, in accordance with an exemplary embodiment of the present disclosure. As shown, the seal 100 includes the proximal part 102 having the recess 104, the distal part 106 having the notch 202 and the flexible intermediate part 108. The seal 100 is employed on the aperture sealing assembly 302, arranged on the engine firewall 304. The aperture sealing assembly 302 includes an intermediate housing 310 arranged on the engine firewall 304, a first seat member 312 coaxially coupled to the intermediate housing 310 and a second seat member 314 arranged on the first seat member 312. The first seat member 312 may be part of a fitting to accommodate services passing through the aperture of the engine wall 304. Between the intermediate housing 310 and either one of or both of the engine fire wall and the seal 100 there may be a further wet seal not shown in the figure. The recess 104 of the proximal part 102 is configured to receive a seat disc 322 extending radially from the second seat member 314 for securing the proximal part 102 with the second seat member 314. The notch 202 of the distal part 106 is configured to receive a periphery 324 of the intermediate housing 310 to allow the distal part 106 to rest on the periphery 324. Furthermore, the distal part 106 includes orthogonal tabs 326 forming the notch 202 to receive the periphery 324.

Figure 4:
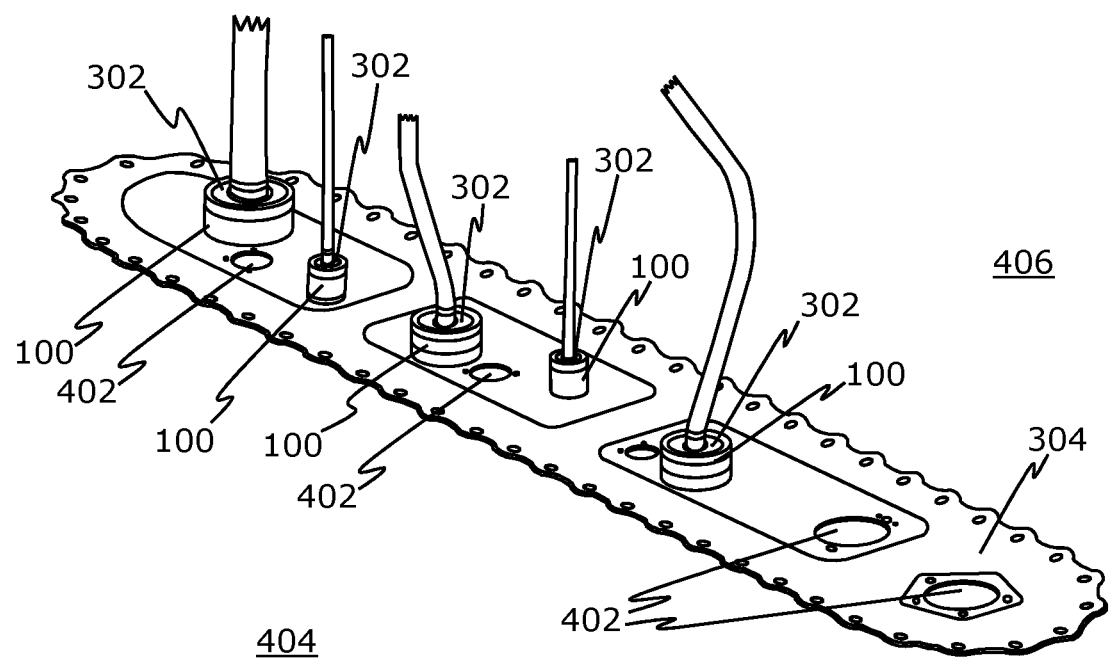
FIG. 4 is a perspective view of seals employed on the engine firewall, in accordance with an exemplary embodiment of the present disclosure.

Referring to FIG. 4, illustrated is a perspective view of seals 100 employed on an engine firewall 304, in accordance with an exemplary embodiment of the present disclosure. The seals 100 are employed on aperture sealing assemblies 302 arranged on apertures (such as apertures 402, configured on the engine firewall 304, such as a service tray). The engine firewall 304 separates a high temperature zone 404 from a low temperature zone 406.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An aperture sealing assembly for a firewall of an engine, comprising:
   a seal including:
   a proximal part having a radially inwardly opening circumferential recess;
   a distal part having a circumferential notch; and
   a flexible intermediate part integrally extending between the proximal part and the distal part;
   wherein the firewall includes a first side exposed to a first temperature zone of the engine and an opposite second side exposed to a second temperature zone of the engine;
   a cylindrical intermediate housing having an exterior directly connected to the engine firewall and an internal bore, the intermediate housing including a first portion extending axially beyond the first side of the firewall and a second portion extending axially beyond the second side of the firewall, the internal bore extending through the first portion and the second portion;
   a first seat member coaxially coupled to the internal bore of the intermediate housing;
   a second seat member positioned axially on the first seat member;
   seat disc extending radially outwardly from the second seat member and engaging the radially inwardly opening circumferential recess, thereby securing the second seat member to the proximal part; and
   the circumferential notch receiving and engaging the second portion of the intermediate housing.

2. The aperture sealing assembly according to claim 1, wherein the distal part comprises orthogonal tabs forming the circumferential notch.

3. The aperture sealing assembly according to claim 1, where the flexible intermediate part comprises a centrally located fabric-reinforced layer.

4. The aperture sealing assembly according to claim 3, wherein the seal further comprises a flame-resistant layer arranged on an outer surface of the fabric-reinforced layer.

5. The aperture sealing assembly according to claim 1, wherein the seal further comprises a flame-resistant layer arranged on an outer surface thereof.

6. An aircraft engine, comprising the aperture sealing assembly according to claim 1.

7. The aperture sealing assembly according to claim 1, wherein the first temperature zone is a high temperature zone of the engine and the second temperature zone is a low temperature zone of the engine.

8. The aperture sealing assembly according to claim 7, wherein the seal is positioned entirely in the low temperature zone of the engine.

* * * * *